United States Patent [19]

MacPherson et al.

[11] Patent Number: 5,438,474
[45] Date of Patent: Aug. 1, 1995

[54] PROTECTIVE SHEATH

[75] Inventors: Hugh MacPherson, Fife; David McNaughton, Keltie Bridge; Neal Croxford; Christopher F. Parsons, both of Warwickshire, all of England

[73] Assignee: W. L. Gore & Associates (UK) Ltd., London, United Kingdom

[21] Appl. No.: 265,055

[22] Filed: Jun. 24, 1994

Related U.S. Application Data

[63] Continuation of Ser. No. 915,483, Jul. 16, 1992, abandoned.

[30] Foreign Application Priority Data

Jul. 19, 1991 [GB] United Kingdom ............... 9115641

[51] Int. Cl.⁶ .................... G08B 29/00; H01B 7/00
[52] U.S. Cl. ............................ 361/158; 340/510; 174/120 SC
[58] Field of Search ............... 337/414–416; 361/158; 174/119 C, 120 C, 122 C, 121 SR, 122 R, 100 W; 385/106; 138/129, 140, 145, 146, 104; 340/510, 550, 564

[56] References Cited

U.S. PATENT DOCUMENTS

| | | | |
|---|---|---|---|
| 3,956,726 | 5/1976 | McCarthy et al. | 337/414 |
| 4,785,743 | 11/1988 | Dalphin | 109/40 |
| 4,859,989 | 8/1989 | MacPherson | 340/510 |
| 4,972,175 | 11/1990 | MacPherson | 340/510 |
| 5,228,478 | 7/1993 | Kleisle | 138/104 |

FOREIGN PATENT DOCUMENTS

| | | |
|---|---|---|
| 277679 | 8/1988 | European Pat. Off. |
| 0317101 | 10/1988 | European Pat. Off. |
| 1375926 | 12/1974 | United Kingdom |
| 2220513 | 11/1990 | United Kingdom |
| 2245738 | 1/1992 | United Kingdom |
| WO87/06749 | 11/1987 | WIPO |

OTHER PUBLICATIONS

Patent Abstract—JP2157710—18.06.90, Matsushita Electric Ind. Co. Ltd.
Patent Abstract—JP58-130301—Furukawa, 3 Aug. 1983.
Patent Abstract—JP60-125806, 5 Jul. 1985.

Primary Examiner—Steven L. Stephan
Assistant Examiner—Aditya Krishnan
Attorney, Agent, or Firm—Gary A. Samuels

[57] ABSTRACT

There is disclosed a tubular protective sheath for containing a power transmission conduit, the sheath comprising: first and second flexible elements each helically arranged to form respective inner and outer tubular members. The first element is in the form of a first electrically insulating film having respective first and second layers of electrically conductive low melt material adherent to its opposite surfaces. The second element is in the form of a second electrically insulating film having a third layer of electrically conductive low melt material adherent to one surface. The first element is configured in overlapping arrangement with the respective first and second low melt layers in contact and the second element is configured in overlapping arrangement with the third low melt layer spaced from the adjacent first or second low melt layer of the first element by the second insulating film, a break in the power transmission conduit resulting in heating of the sheath and melting of one or more of the low melt layers and flow of low melt material to form an electrical connection between the respective low melt layers of the elements.

13 Claims, 3 Drawing Sheets

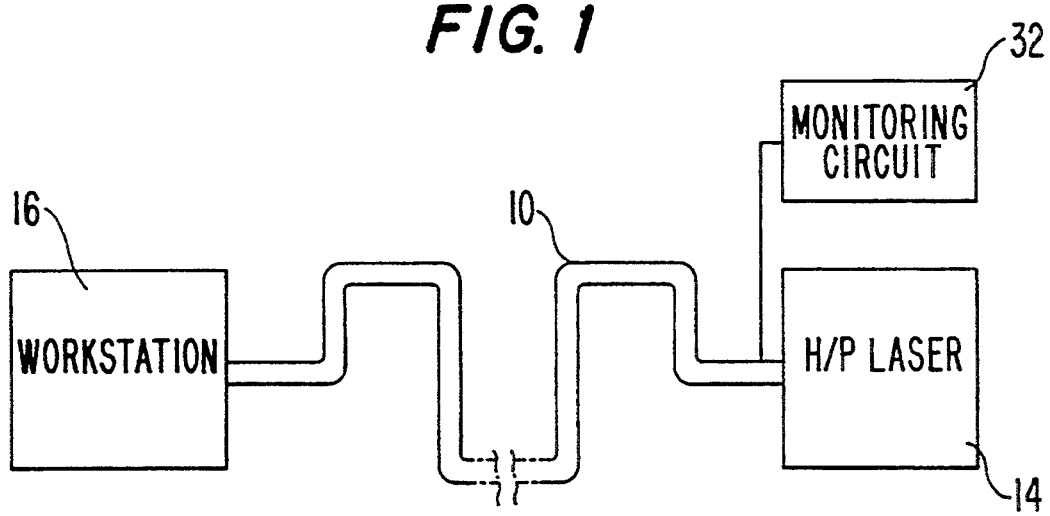
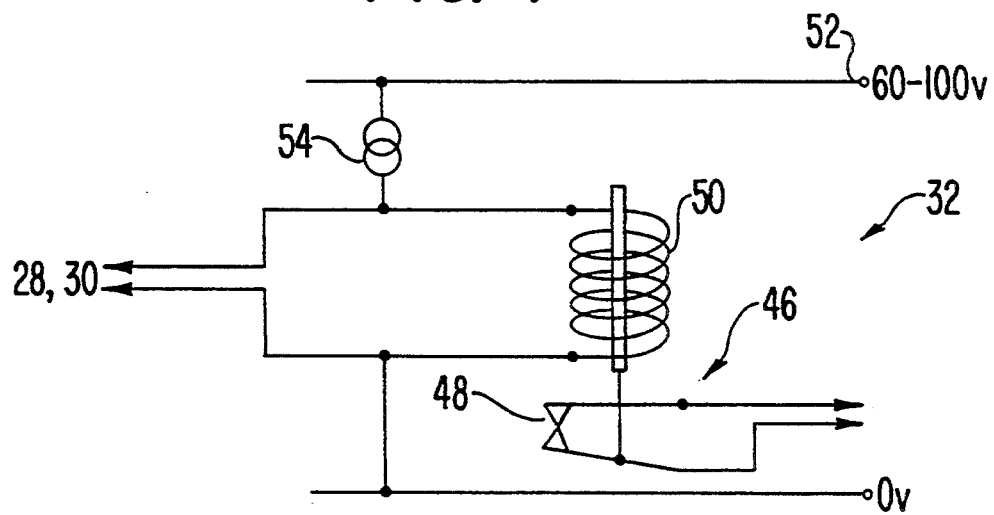

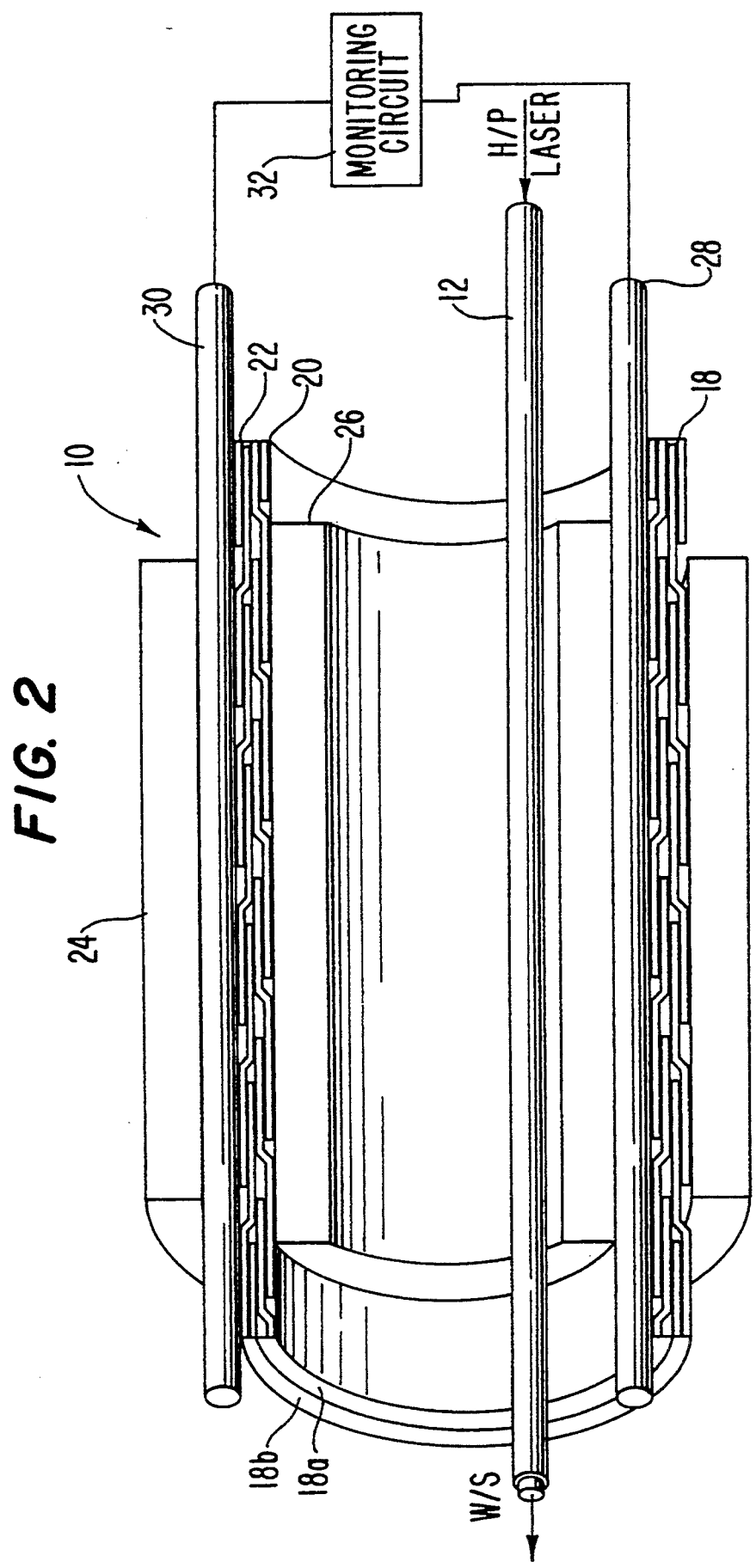

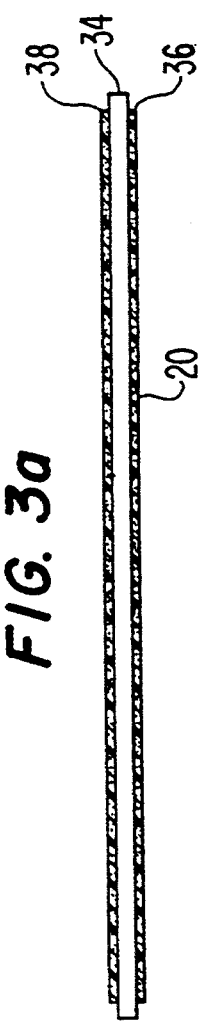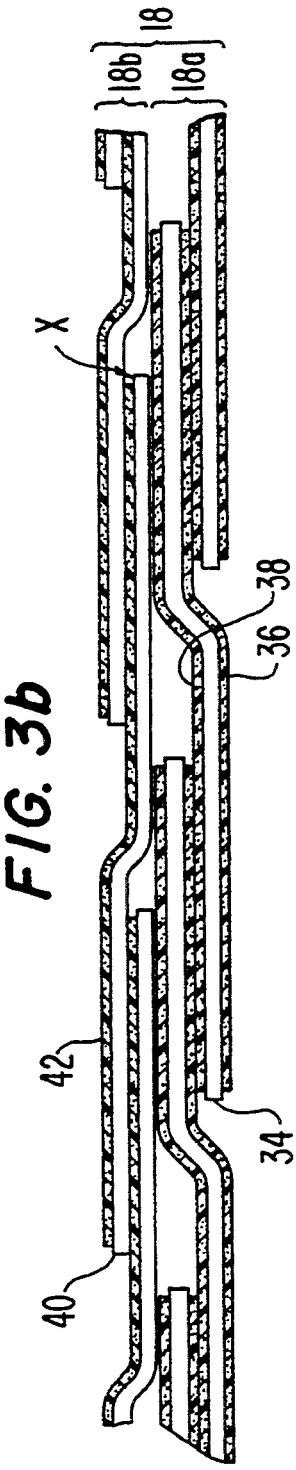

PROTECTIVE SHEATH

This application is a continuation of application Ser. No. 07/915,483 filed Jul. 16, 1992 now abandoned.

FIELD OF THE INVENTION

This invention relates to a protective sheath including means for providing warning of the formation of a breach in the sheath. The present invention has particular application in providing a safety barrier around a power conduit such as an optical fibre serving as a power conduit for a high power laser.

BACKGROUND OF THE INVENTION

Power conduits may be used to transfer power from a power source to a power consumer. In many cases, safe transmission of the particular form of energy will require the conduit to be sheathed in protective material. If the power conduit is broken or damaged a breach in the sheathing material may result in damage to adjacent equipment or injury to personnel. In the case of an optical fibre which acts as a power conduit between a high power laser and one or more work stations, a fracture of the optical fibre could result in immediate burning of the conduit and a consequential safety hazard to equipment and personnel.

It is an object of the present invention to provide an improved safety barrier for use in sheathing such power conduits.

SUMMARY OF THE INVENTION

According to one aspect of the present invention there is provided a tubular protective sheath for containing a power transmission conduit, the sheath comprising:

first and second flexible elements each helically arranged to form one of an inner and outer tubular member, the first element in the form of a first electrically insulating film having respective first and second layers of electrically conductive low melt material adherent to its opposite surfaces, the second element in the form of a second electrically insulating film having a third layer of electrically conductive low melt material adherent to one surface, the first element configured in overlapping arrangement with the respective first and second low melt layers in contact, the second element configured in overlapping arrangement with the third low melt layer spaced from the adjacent first or second low melt layer of the first element by the second insulating film, a break in the power transmission conduit resulting in heating of the sheath and melting of one or more of the low melt layers and flow of low melt material to form an electrical connection between the respective low melt layers of the elements; and monitoring means connected to the low melt layers for detecting such electrical connection between the layers.

In use, a break in the power transmission conduit resulting in heating of the sheath will also result in formation of breaks in the insulating films, through which the low melt material may flow. On detection of an electrical connection between the low melt layers by the monitoring means an alarm may be activated and the power supply to the power transmission conduit shut off. Thus, damage to the power transmission conduit will be detected quickly and the damage caused by release of energy from the damaged conduit will be minimised.

Preferably, the connection between the monitoring means and the low melt layers is in the form of respective relatively high conductivity drain members. The drain members provide a low resistance path between the low melt layers and the monitoring means to facilitate detection of a connection between the low melt layers, and use of the members is particularly advantageous if the sheath is of any significant length. Most preferably, one drain member is in contact with the outer surface of the outer tubular member and the other drain member is in contact with the inner surface of the inner tubular member. The high conductivity drain members may be in the form of round or flat metal conductors, or may be in the form of flexible conductive strips and such strips may be helically wound.

Preferably also, the third low melt layer of the second element does not extend to the edges of the insulating film to assist in preventing stray connections between the third low melt layer and the first and second low melt layers of the first element.

Preferably also, the sheath further comprises an internal tubular member of low friction material to facilitate location of the power transmission conduit in the sheath.

Preferably also, the sheath includes an outer protective jacket.

Conveniently, each low melt material layer is 8-12 microns in thickness and the insulating film is about 23 microns in thickness. The low melt material preferably fluidises at about 100° C.

Preferably, the electrically insulating film is of polyester, such as Mylar (trade mark) and the low melt material is carbon filled polyester, the latter being applied to the insulating films by ink wheel printing. Typically the carbon filled polyester is 50% filled with graphitic carbon to provide a resistivity of the order of 0.3 ohms-cm. Other materials may be used to form the electrically conductive low melt material for example certain thermoplastic resins such as polyamides, polyethers, polyurethanes, polyvinylacetate and certain uncured silicones loaded with carbon or conductive salts such as caesium iodide. Primarily these materials are of low molecular weight and fluidise at temperatures in the range 70°-130° C.

According to a further aspect of the present invention there is provided a tubular sheath comprising:

first and second flexible elements each arranged to form one of an inner and outer tubular member, the first element of electrically conductive low melt material, the second element in the form of an electrically insulating film having a layer of electrically conductive low melt material adherent to one surface, the second element configured in an overlapping helical arrangement with the low melt layer spaced from the first element by the insulating film, a break in the sheath involving elevated temperature resulting in heating of the sheath and melting of the low melt material and flow of low melt material to form an electrical connection between the first element and the low melt material layer; and monitoring means connected to the first element and the low melt layer for detecting such electrical connection therebetween.

In use, the elevated temperature will also result in the formation of a hole in the insulating film, such that the low melt material may flow through the film to form an electrical connection between the respective low melt material layers. The source of elevated temperature creating the break in the sheath may be a damaged power conduit contained within the sheath, or may be an external source of heat, such as a cutting tool. On detection of the break in the sheath, the monitoring means may activate an alarm or, if the sheath contains a power transmission conduit, cut off the power supply to the conduit.

BRIEF DESCRIPTION OF THE DRAWINGS

These and other aspects of the present invention will now be described, by way of example, with reference to the accompanying drawings, in which;

FIG. 1 is a diagram of an application of a protective sheath in accordance with a preferred embodiment of the present invention;

FIG. 2 is an enlarged sectional view of the sheath of FIG. 1;

FIGS. 3a, 3b and 3c are further enlarged sectional views of: a first element; a portion of the sheath of FIG. 1 incorporating a first element and a second element; and a second element, respectively; and FIG. 4 is a diagrammatic representation of the monitoring circuit of the sheath of FIG. 1 (on same sheet as FIG. 1).

DETAILED DESCRIPTION OF DRAWINGS

Reference is first made to FIG. 1 of the drawings which shows a tubular protective sheath 10 in accordance with a preferred embodiment of the present invention, the sheath 10 providing a safety barrier around an optical fibre 12 (FIG. 2) which acts as a power conduit between a high power laser 14 and one or more workstations 16 (only one shown). The energy carried by the optical fibre 12 is such that a fracture of the fibre 12 would result in immediate burning of the conduit and sheath and a consequential safety hazard to equipment and people. As will be described, the present invention is intended to obviate or mitigate this hazard by providing means which permit the condition of the conduit to be monitored such that the supply of energy through the fibre 12 may be cut off if the integrity of the sheath 10 is compromised.

Reference is now made also to FIG. 2 of the drawings, which shows a portion of the fibre and sheath, in section. The sheath 10 comprises: an outer jacket 24; a detection layer 18 having inner and outer tubular members 18a, 18b, formed of first and second respective elements in the form of tapes 20, 22 (shown in more detail in FIG. 3 of the drawings) which are helically wound in overlapping relationship to form the inner and outer tubular members 18a, 18b; an inner tube 26; and conductive members in the form of drain wires 28, 30, which are connected to a monitoring circuit 32. The optical fibre 12 passes through the inner tube 26 and is of considerably smaller diameter than the sheath.

The fibre may be retro-fitted in the sheath and the inner tube 26 is therefore of a low friction material, such as polytetrafluoroethylene (PTFE). In this example the inner tube 26 has a diameter of 3 mm, whereas the optical fibre 12 has a diameter of 600 microns.

As mentioned above, the tubular members 18a, 18b formed by the tapes 20, 22 form a detection layer 18, each of the tapes 20, 22 being wound in overlapping relation. It is necessary for the tapes to overlap, as otherwise bends in the sheath would result in unacceptable gaps at the outer radius of the sheath.

The first tape 20 is in the form of an electrically insulating film 34 having respective layers of electrically conductive low melt material 36, 38 adherent to its opposite surfaces. The second tape 22 is in the form of an electrically insulating film 40 having a layer 42 of electrically conductive low melt material adherent to one surface. The insulating films 34, 40 are preferably formed of Mylar and the low melt material forming the layers 36, 38, 42 is preferably carbon filled polyester, with a carbon loading of about 50% by weight to give a resistivity of approximately $0.3 \geqq 0.4$ ohms-cm.

The second tape 22 overlies the first tape 20 with the low melt layer 42 spaced from the adjacent low melt layer 38 of the first tape by the insulating film 40. A fracture in the optical fibre 12 would lead to a hole being burned through the sheath, and when a hole is burned through the detection layer 18, the low melt material forming the layers 36, 38, 42 is fluidised and may thus flow to form an electrical connection between the respective layers 36, 38, 42 of the tapes 20, 22 and thus form a connection between the drain wires 28, 30, which connection is detected by the monitoring circuit 32 which in turn shuts off the laser 14. A fractured optical fibre would normally result in one or more holes being formed through the insulating film 34 in the first tape, and more importantly through the insulating film 40 on the second tape through which the low melt material may flow.

As will be seen more clearly in FIG. 3, the first tape 20 is overlapped such that the low melt material layers 36, 38 are in contact with one another and thus effectively form a single conductive member. It will also be noted that a gap X of 0.5 to 1 mm is provided between the edges of the low melt material layer 42 and the adjacent edges of the insulating film 40 to prevent stray conduction between the tapes 20, 22. Layers 36, 38 may be similarly spaced from the edges of film 34.

The sheath is likely to be of some length and thus it is in many cases necessary to provide drain wires 28, 30 to provide a low resistance path to the monitoring circuit 32. It is preferred to locate the wires 28, 30 on either side of the detection layer 18, and the inner low melt material layer 36 provides a conductive inner coating for the layer to form a connection with the wire 28. Although the wires 28, 30 are illustrated in the form of stranded metal, preferably copper, other configurations of conductor may be used such as a flat copper conductor, aluminium coated Mylar or a carbon filled PTFE strip. Where the conduit will be subject to flexure, it is necessary to provide flexible conductors which will not abrade or otherwise damage the detection layer 18. In such applications, helically wound carbon filled PFTE may be used.

FIG. 4 of the drawings illustrates the monitoring circuit 32 in more detail. In this example the circuit includes a relay 46 with normally open contacts 48 which, in normal operation, are held closed to complete a laser power control circuit (not shown). The relay coil 50 is supplied from a voltage source 52, through a current limiter 54, set slightly higher than the threshold to hold the contacts 48 closed. The coil 50 is also connected to the tapes 20, 22 via the drain wires 28, 30. In normal operation there is very high resistance between the wires 28, 30 (megohms per meter length) and an electrical connection between the tapes 20, 22 through flow of the low melt material 36, 38, 42 provides an electrical loop with a resistance of less than 1 kohm. In the event of such a break in the sheath the current from the source 52 is divided between the loop created by the fault and the relay coil 50 such that the current in the coil 50 is reduced below its threshold level and the contacts 48 open, switching off power to the circuit.

Thus it will be seen that the sheath described above provides means which will detect a break in the sheath due to the localised heating which results from a fracture in the optical fibre 12. The sheath will also similarly detect a hole being burned through the sheath from the outside of the sheath.

It will be clear to those of skill in the art that the above description is merely exemplary of the present invention and that various improvements and modifications may be made to the example without departing from the scope of the present invention: for example, the first and second tapes may be arranged in different configurations, and the first tape could equally well form the outer tubular member and the second tape form the inner tubular member. In other embodiments, the first tape may be solely of electrically conductive low melt material, and thus be in the form of a continuous tube.

I claim:

1. A tubular protective sheath for containing a power transmission conduit, the sheath comprising:
    first and second flexible elements each helically arranged to form one of an inner and outer tubular member, the first element in the form of a first electrically insulating film having respective first and second layers of electrically conductive low melt material adherent to its opposite surfaces, the second element in the form of a second electrically insulating film having a third layer of electrically conductive low melt material adherent to one surface, the first element configured in overlapping arrangement with the respective first and second low melt layers in contact, the second element configured in overlapping arrangement with the third low melt layer spaced from the adjacent first or second low melt layer of the first element by the second insulating film, a break in the power transmission conduit resulting in heating of the sheath and melting of one or more of the low melt layers and flow of low melt material to form an electrical connection between the respective low melt layers of the elements; and
    monitoring means connected to the low melt layers for detecting such electrical connection between the layers.

2. The protective sheath of claim 1 in which connection between the monitoring means and the low melt layers is provided by respective relatively high conductivity drain members to provide a low resistance path between the low melt layers and the monitoring means.

3. The protective sheath of claim 2 in which one drain member is in electrical contact with the outer surface of the outer tubular member over the length of the sheath and the other drain member is in electrical contact with the inner surface of the inner tubular member over the length of the sheath.

4. The protective sheath of claim 1 in which the third low melt layer does not extend to the edges of the second insulating film to assist in preventing stray connections between the third low melt layer and the first and second low melt layers.

5. The protective sheath of claim 1 in which the sheath further comprises an internal tubular member of low friction material to facilitate location of the power transmission conduit in the sheath.

6. The protective sheath of claim 1 in which the sheath includes an outer protective jacket.

7. The protective sheath of claim 1 in which each low melt material layer is 8–12 microns in thickness.

8. The protective sheath of claim 1 in which the low melt material is of low molecular weight and fluidises at 70°–130° C.

9. The protective sheath of claim 1 in which the monitoring means is operable to shut off the power supply to a power transmission conduit located within the sheath on detection of such electrical connection between the low melt layers.

10. The protective sheath of claim 9 in which the monitoring means includes a relay connected to an electrical source in parallel with the drain members, the relay being connected to a power control circuit for the power transmission conduit, an electrical connection between the low melt layers resulting in current from the source being divided between the relay and a loop created by the drain members and the electrically connected low melt layers causing the current to the relay to fall below a threshold level and the relay to switch to shut off the power supply to the power transmission conduit.

11. A tubular protective sheath for containing a power transmission conduit, the sheath comprising:
    first and second flexible elements each helically arranged to form one of an inner and outer tubular member, the first element in the form of a first electrically insulating film having respective first and second layers of electrically conductive low melt material adherent to its opposite surfaces, the second element in the form of a second electrically insulating film having a third layer of electrically conductive low melt material adherent to one surface, the first element configured in overlapping arrangement with the respective first and second low melt layers in contact, the second element configured in overlapping arrangement with the third low melt layer spaced from the adjacent first or second low melt layer of the first element by the second insulating film, a break in the power transmission conduit resulting in heating of the sheath and melting of one or more of the low melt layers and flow of low melt material to form detectable electrical connection between the respective low melt layers of the elements.

12. A length of material for wrapping helically to produce a tubular member for the sheath of claim 11 comprising a length of insulating film carrying a layer of electrically conductive low melt material on one side.

13. A tubular sheath comprising:
    first and second flexible elements each arranged to form one of an inner and outer tubular member, the first element of electrically conductive low melt material, the second element in the form of an electrically insulating film having a layer of electrically conductive low melt material adherent to one surface, the second element configured in an overlapping helical arrangement with the low melt layer spaced from the first element by the insulating film, a break in the sheath involving elevated temperature resulting in heating of the sheath and melting of the low melt material and flow of low melt material to form an electrical connection between the first element and the low melt material layer; and
    monitoring means connected to the first element and the low melt layer for detecting such electrical connection therebetween.

* * * * *